United States Patent [19]
Iino et al.

[11] Patent Number: 6,144,140
[45] Date of Patent: Nov. 7, 2000

[54] ULTRASONIC MOTOR AND ELECTRONIC DEVICE FITTED WITH ULTRASONIC MOTOR

[75] Inventors: Akihiro Iino; Kenji Suzuki; Masao Kasuga, all of Chiba, Japan

[73] Assignee: Seiko Instruments Inc., Japan

[21] Appl. No.: 09/207,310

[22] Filed: Dec. 7, 1998

[30] Foreign Application Priority Data

Sep. 12, 1997 [JP] Japan .................................. 9-338507

[51] Int. Cl.⁷ ........................................... H01L 41/08
[52] U.S. Cl. ........................... 310/316.02; 318/116
[58] Field of Search ....................... 310/316.02; 318/116

[56] References Cited

U.S. PATENT DOCUMENTS

| | | | |
|---|---|---|---|
| 5,087,850 | 2/1992 | Suzuta | 310/316 |
| 5,146,143 | 9/1992 | Furutsu | 318/116 |
| 5,461,273 | 10/1995 | Kawasaki et al. | 310/316 |
| 5,493,163 | 2/1996 | Nishikawa | 310/316.02 |
| 5,495,152 | 2/1996 | Fukui | 318/116 |
| 5,500,578 | 3/1996 | Kawamura | 318/116 |
| 5,619,089 | 4/1997 | Suzuki et al. | 310/323 |
| 5,770,912 | 6/1998 | Suzuki et al. | 310/316 |

Primary Examiner—Nestor Ramirez
Assistant Examiner—Peter Medley
Attorney, Agent, or Firm—Adams & Wilks

[57] ABSTRACT

An ultrasonic motor has a piezoelectric element, a driver circuit for creating an excitation signal based on information about the excitation of the piezoelectric element, and a power supply for supplying a voltage to the driver circuit. This motor includes a voltage-adjusting circuit for adjusting the voltage supplied from the power supply to the driver circuit. The motor further includes a voltage comparison means for comparing the voltage detected by the voltage-detecting means with data about a preset voltage of the power supply and a circuit constant control means for controlling the voltage-adjusting circuit to optimize the voltage supplied to the driver circuit, for example, if the comparison made by the voltage-comparing means indicates that the detected voltage is not coincident with the data about the voltage of the power supply.

31 Claims, 11 Drawing Sheets

STOP SIGNAL GENERATING CIRCUIT

ULTRASONIC MOTOR AND ELECTRONIC DEVICE FITTED WITH ULTRASONIC MOTOR

BACKGROUND OF THE INVENTION

The present invention relates to improvements in an ultrasonic motor driven by a self-excited oscillator circuit and improvements in electronic devices fitted with an ultrasonic motor.

In recent years, ultrasonic motors producing driving force by making use of the piezoelectric effect of a piezoelectric element have attracted attention in the field of micromotors. A simple self-excited oscillator circuit using excitation of a piezoelectric element is known as a driver circuit for such an ultrasonic motor. It has the advantage that any circuit for varying the frequency in response to variations in temperature or external load is unnecessary.

A known example of such a self-excited oscillator circuit has a piezoelectric element excited at a given frequency, an amplifier circuit for amplifying the excitation signal, and a filter circuit for setting the excitation signal to a given frequency (for example, see Japanese Unexamined Patent Publication No. Hei. 08-251952).

A vibrator bonded to the piezoelectric element is bent and oscillated. A frictional force is applied to a moving body pressed against the vibrator, thus rotating the moving body in a given direction.

In the self-excited oscillator circuit described above, however, the circuit constants such as time constant and resistances are set constants and so the rotational speed of the moving body cannot be controlled. For instance, where an ultrasonic motor is applied to a timepiece and the time indicated by the hands of the timepiece is corrected, a long time is necessary with ordinary rotational speeds. Where the motor is applied to a portable tape recorder and rewinding is done, the rotational speed produced during playback is too slow.

Usually, the circuit constants of the self-excited oscillator circuit are set to values midway between the optimum values where the load is large at start and the optimum values in a steady state. Therefore, the torque necessary at start is insufficient. Meanwhile, in a steady state, the speed does not reach the target rotational speed.

The battery voltage of the power supply used for the amplifier circuit and the like varies with use. Consequently, as the voltage of the power supply varies due to aging characteristics, it is necessary to optimize the voltage delivered to the amplifier circuit.

SUMMARY OF THE INVENTION

It is an object of the present invention to provide an ultrasonic motor and electronic device fitted with an ultrasonic motor in which rotation of a moving body is controlled and optimum circuit constants are established according to variations in load and variations in power-supply voltage due to aging characteristics.

That is, in one aspect of the present invention an ultrasonic motor comprises a piezoelectric element, a driver circuit for generating an excitation signal according to information about excitation of the piezoelectric element, and a power supply for supplying a voltage to the driver circuit. This is characterized in that it has a voltage-adjusting circuit for adjusting the voltage supplied to the driver circuit from the power supply.

The driver circuit can consist of only an amplifier circuit; an amplifier circuit plus a step-up circuit; or a combination of an amplifier circuit, a step-up circuit, and a phase-adjusting circuit. For example, the voltage-adjusting circuit includes a variable resistor.

In this structure, the power supply supplies a voltage to the driver circuit. The driver circuit generates an excitation signal according to information about the excitation of the piezoelectric element. The voltage-adjusting circuit adjusts the voltage supplied from the power supply to the driver circuit.

Accordingly, where the rotational speed of the moving body is varied and the load varies, or where the power-supply voltage ages, the voltage supplied to the driver circuit is optimized.

In another aspect of the present invention the ultrasonic motor set forth in claim 1 and further characterized in that the voltage-adjusting circuit adjusts the voltage supplied to an amplifier circuit for amplifying the excitation signal, the amplifier circuit being included in the driver circuit.

In this configuration, the voltage-adjusting circuit adjusts the voltage supplied to the amplifier circuit for amplifying the excitation signal, the amplifier circuit being included in the driver circuit. Therefore, where the load varies, for example, the voltage supplied to the amplifier circuit is optimized.

In another aspect of the present invention the ultrasonic motor is further characterized in that the voltage-adjusting circuit adjusts the voltage supplied to a step-up circuit for stepping up the excitation signal, the step-up circuit being included in the driver circuit.

In this structure, the voltage-adjusting circuit adjusts the voltage supplied to the step-up circuit for stepping up the excitation signal, the step-up circuit being included in the driver circuit. Therefore, where the load varies, for example, the voltage supplied to the step-up circuit is optimized. Compared with the case where a voltage is supplied by the amplifier circuit and limited in driving voltage range in the same way as in the previous aspect of the invention, the self excitation occurs more stably and can assume voltages in a wider range.

In another aspect of the present invention an ultrasonic motor is fitted with a driver circuit for driving a plurality of amplifier circuits connected in parallel. This motor is characterized in that it further includes a selector circuit for adjusting the output impedance by selecting one or more of the plural amplifier circuits which are made to function.

In this structure, the selector circuit selects one or more of the amplifier circuits which are caused to function, thus adjusting the output impedance of the amplifier circuits. Therefore, where the rotational speed, the power-supply voltage, the load, or the like varies, for example, the output impedance of the amplifier circuits is optimized.

In another aspect of the present invention an ultrasonic motor is fitted with a driver circuit having a phase-adjusting circuit for setting the phase of the excitation signal. This motor is characterized in that it further includes a phase-adjusting circuit for adjusting the phase of the excitation signal set by the phase-setting circuit.

In this configuration, the phase-adjusting circuit adjusts the phase of the excitation signal set by the phase-adjusting circuit. Therefore, the rotational speed of the moving body can be modified. Where the voltage of the power supply or the load changes, the time constant of the phase-setting circuit is optimized.

In another aspect of the invention the ultrasonic motor is further characterized in that the phase-adjusting circuit is a variable-capacitance element varied by an externally applied voltage.

This variable-capacitance element embraces a variable-capacitance diode.

In this configuration, the variable-capacitance element adjusts the phase of the excitation signal set by the phase-setting circuit. Therefore, the rotational speed of the moving body can be modified. Where the voltage of the power supply or the load varies, the time constant of the phase-setting circuit is optimized.

In another aspect of the invention the ultrasonic motor is further characterized in that the phase-adjusting circuit has a plurality of circuit elements connected in parallel and a selector element for selecting one or more of the circuit elements which are made to function.

The circuit elements described above include capacitors, resistors, and coils. These elements may be combined arbitrarily.

In this configuration, one or more of the circuit elements connected in parallel which are made to function are selected, and the phase of the excitation signal is adjusted. Therefore, the rotational speed of the moving body can be modified. Where the power-supply voltage or load varies, the time constant of the phase-setting circuit is optimized.

In another aspect of the invention an ultrasonic motor fitted with the driver circuit and characterized in that it further includes a variable-resistance element for adjusting the current supplied to the driver circuit.

In this configuration, the variable-resistance element varies the resistance value, adjusting the current supplied into the driver circuit. Consequently, the rotational speed of the moving body can be modified. Where the power-supply voltage or the load varies, the current supplied to the driver circuit is optimized.

In another aspect of the invention an ultrasonic motor of the types described above and comprises a rotational speed-detecting means for detecting the rotational speed of the moving body rotated based on the excitation of the piezoelectric element; a rotational speed-comparing means for comparing the rotational speed detected by the rotational speed-detecting means with a preset rotational speed; and a rotational speed control means for controlling the circuit constant of the driver circuit to bring the rotational speed of the moving body into agreement with the preset rotational speed if the detected rotational speed is not coincident with the preset rotational speed.

The circuit constant described above is formed by the aforementioned voltage-adjusting circuit, phase-adjusting circuit, variable-resistance element, and selector circuit.

In this configuration, the rotational speed-detecting means detects the rotational speed of the moving body rotated based on excitation of the piezoelectric element. The rotational speed-comparing means compares the rotational speed detected by the rotational speed-detecting means with preset rotational speed. The rotational speed control means controls the time constant of the driver circuit so as to bring the rotational speed of the moving body into agreement with the preset rotational speed provided that the result of comparison made by the rotational speed-comparing means is that the detected rotational speed is not coincident with the preset rotational speed.

Accordingly, the moving body of the ultrasonic motor is rotated at a desired rotational speed.

In another aspects of the invention the ultrasonic motor as described above further comprises: time measuring means for measuring time elapsing since a start time; time-comparing means for comparing the elasped time measured by the time-measuring means with time elapsing from the start time to an instant when a steady state is reached; and a circuit constant control means for controlling the circuit constant of the driver circuit so that the circuit constant is best adapted for the steady state if the result of the comparison made by the time-comparing means is that the measured time is coincident with the data about the time.

In this configuration, the time-measuring means measures the time elapsing since the start time. The time-comparing means compares the elasped time measured by the time-measuring means with time elapsing from the start time to the instant when the steady state is reached. The circuit constant control means controls the circuit constant of the driver circuit to optimize the steady state if the result of the comparison made by the time-comparing means is that the measured time is coincident with the data about time.

Therefore, the ultrasonic motor is driven according to variations in the load occurring between start and steady state.

In another aspect of the invention an ultrasonic motor as described above further and comprises voltage-detecting the means for detecting voltage of a power supply; voltage-comparing means for comparing the voltage detected by the voltage-detecting means with a preset voltage of the power supply; and a circuit constant control means for controlling the circuit constant of the driver circuit to its optimum value if the result of the comparison made by the voltage-comparing means is that the detected voltage is not in agreement with the preset the voltage of the power supply.

In this configuration, the voltage-detecting means detects the voltage of the power supply. The voltage-detecting means compares the voltage detected by the voltage-detecting means with the preset voltage of the power supply. The circuit constant control means controls the circuit constant of the driver circuit to its optimum value if the result of the comparison made by the voltage comparison means is that the detected voltage is not coincident with the preset the voltage of the power supply.

Accordingly, the ultrasonic motor is driven according to variations in the voltage of the power supply.

In another aspect of the invention an electronic device is fitted with an ultrasonic motor as set forth above.

The electronic device described above embraces electronic timepieces, measuring instruments, cameras, printers, printing machines, machine tools, robots, and transport machines.

In this configuration, an electronic device driven by the aforementioned ultrasonic motor is realized.

DETAILED DESCRIPTION OF THE PREFERRED EMBODIMENTS

Embodiments of the present invention are hereinafter described in detail by referring to FIGS. 1 to 9.

{Embodiment 1}

Figure 1:
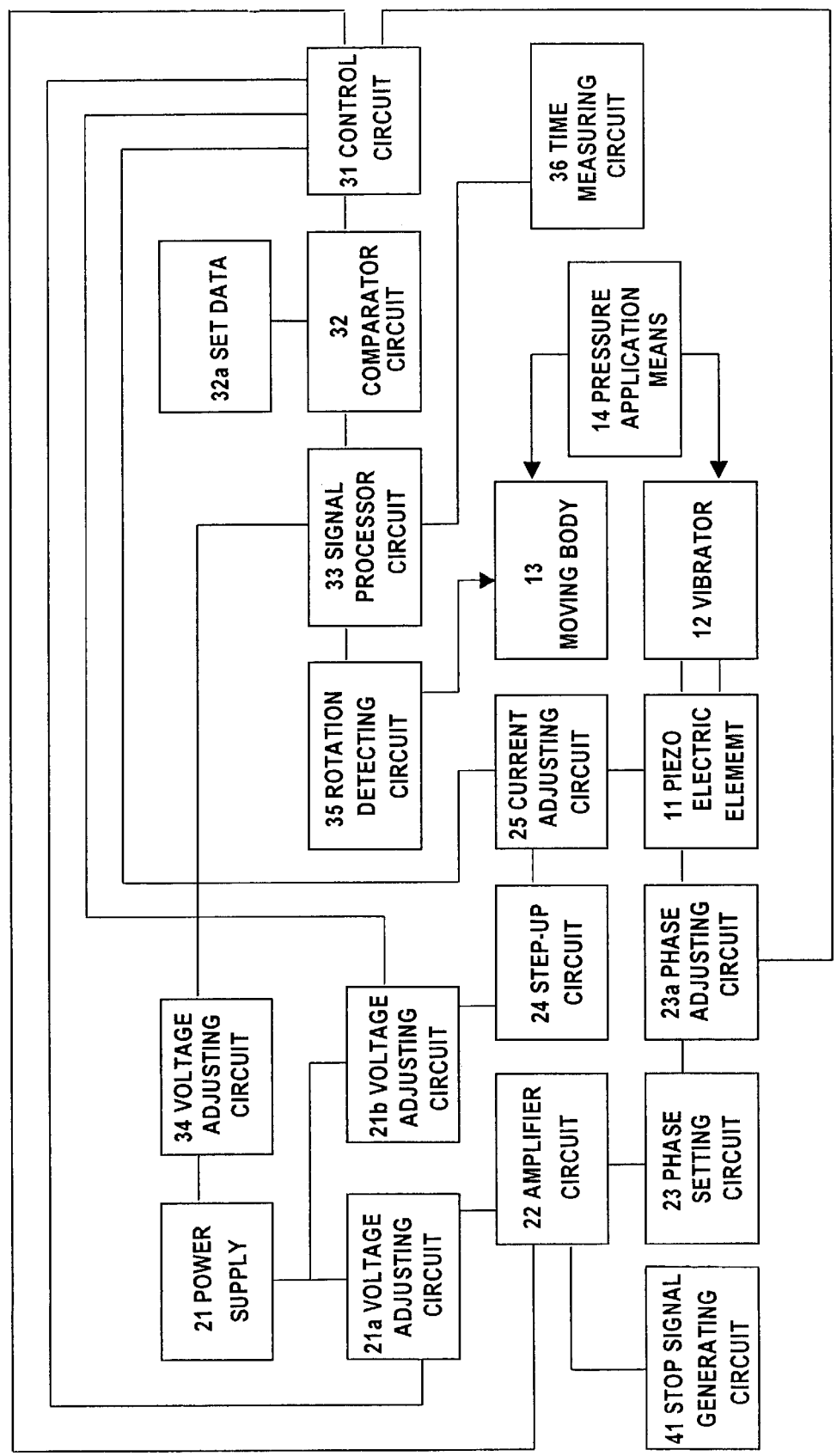
FIG. 1 is a block diagram showing Embodiment 1 of the present invention applied to an ultrasonic motor.

FIG. 1 is a block diagram of Embodiment 1 associated with an ultrasonic motor to which the present invention is applied.

Figure 2:
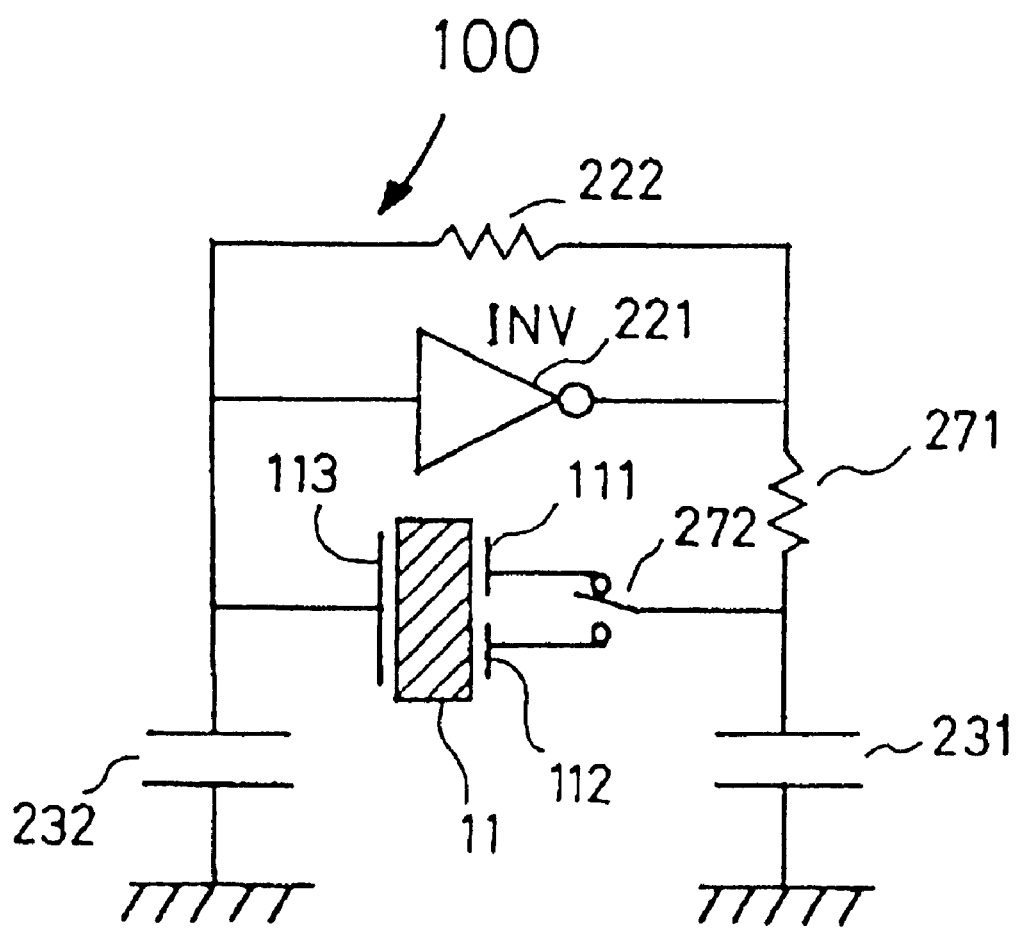
FIG. 2 is a diagram showing a circuit associated with FIG. 1.

FIG. 2 is a diagram showing the circuit of the present embodiment.

The ultrasonic motor comprises an ultrasonic motor body that is a mechanical component, a driver circuit for driving the ultrasonic motor body, a power supply for supplying a voltage to this driver circuit, and a control portion for controlling the driver circuit and the ultrasonic motor body.

In FIG. 1, the ultrasonic motor body comprises a piezoelectric element 11, a vibrator 12 bonded to the piezoelectric element 11, a moving body 13 caused to abut against the vibrator 12, and a pressure application means 14 for applying pressure to the moving body 13 and the vibrator 12.

In this embodiment, the piezoelectric element 11 assumes a disklike form and is circumferentially divided into 8 sectors. On one face, a first electrode pattern 111 is formed on alternate sectors. A second electrode pattern 112 is formed on the other sectors. On the other face, a counter electrode 113 opposite to the two sets of electrode patterns 111 and 112 is formed. Voltage is applied to the first electrode pattern 111 and the second electrode pattern 112 in alternately different directions to polarize the piezoelectric element 11. One of the two sets of electrode patterns 111 and 112 which is to be energized is selected to thereby select the direction of rotation of the moving body 13.

When a voltage is applied to the first electrode pattern 111, the piezoelectric element 11 is excited to a given oscillation frequency by the driver circuit. The excitation of the piezoelectric element 11 is transmitted to the vibrator 12, where a bent standing wave is produced. This vibrator 12 abuts against the moving body 13 at given timing, thus applying a frictional force. The moving body 13 makes rotary movement in a given direction.

A driver circuit 100 comprises an amplifier 22 receiving a voltage from a power supply 21 and a phase-setting circuit 23 for setting the excitation signal amplified by the amplifier circuit 22 to a desired phase.

In FIG. 2, the amplifier circuit 22 comprises an inverter 221 and a resistor 222 connected in parallel with the inverter 221. The input end of the inverter 221 and one end of the resistor 222 are connected with the counter electrode 113 of the piezoelectric element 11. The output end of the inverter 221 and one end of the resistor 222 are connected with the electrode pattern 111 of the piezoelectric element 11 via a resistor 271 and a switching element 272.

When a signal is applied to the input end of the inverter 221, the applied signal is inverted and amplified. The output is produced from the output end. The resistor 222 feeds the output voltage from the inverter 221 back to the input end.

The phase-setting circuit 23 consists of capacitors 231 and 232. One end of the capacitor 231 is connected with the electrode pattern 111 on the piezoelectric element 11, while the other end is grounded. One end of the capacitor 232 is connected with the counter electrode 113 of the piezoelectric element 11, the other end being grounded. The excitation signal amplified by the amplifier circuit 22 is set to a desired phase.

The resistor 271 connected with the output end of the inverter 221 suppresses RF signal oscillating abnormally between the output end of the inverter 221 and the capacitor 231.

The power supply 21 consists of a DC power supply and supplies a given power-supply voltage to the amplifier circuit 22.

In FIG. 1, the control portion comprises a control circuit 31, a comparator circuit 32, a signal processor circuit 33, a voltage-detecting circuit 34, and a voltage-adjusting circuit 21a.

Each of the control circuit 31 and the comparator circuit 32 described above consists of a CPU (central processing unit), a RAM (random access memory), a ROM (read only memory), and so on.

The CPU of the control circuit 31 expands a control program stored in the ROM onto the RAM and executes the program. In particular, where the power-supply voltage is different from the set data, information about control for adjusting the voltage delivered to the amplifier circuit 22 is created, and this information about the control is sent to the voltage-adjusting circuit 21b.

The CPU of the comparator circuit 32 expands a comparison program stored in the ROM and the set data 32a onto the RAM, compares the power-supply voltage with the voltage indicated by the set data 32a, creates information about the comparison, and sends this information about the comparison to the control circuit 31.

The voltage-detecting circuit 34 detects the voltage of the power supply 21 and delivers information about the detected voltage as an analog signal to the signal processor circuit 33.

The signal processor circuit 33 receives the analog signal that is information about the voltage from the voltage-detecting circuit 34. The applied analog signal is converted into a digital signal. The digitized information about the voltage is produced to the comparator circuit 32.

The voltage-adjusting circuit 21a consists of a variable resistor, for example, receives the information about the control from the control circuit 31, varies the resistance value according to the information about the control, adjusts the voltage of the power supply to a desired voltage, and delivers the adjusted voltage to the amplifier circuit 22.

The operation of the ultrasonic motor in accordance with this embodiment is next described.

In FIG. 2, when a power supply 21 (not shown) is turned ON, the inverter 221 produces an output signal, which is applied to the first electrode pattern 111 of the piezoelectric element 11. The applied signal is applied to the input end of the inverter 221 via the piezoelectric element 11 and the counter electrode 113, inverted, amplified, delivered as a 180° out-of-phase signal, and applied back to the first electrode pattern 111.

The inversion and amplification of the signal are repeated in this way, thus producing an excitation signal. This excitation signal oscillates the piezoelectric element 11. The information about the oscillation is produced from the counter electrode 113 as the excitation signal.

This excitation signal is smoothed by the resistor 271 and set to a desired phase by the capacitors 231 and 232. The excitation signal consisting mainly of the natural frequency is produced perpetually.

The piezoelectric element 11 oscillates at its natural frequency. The vibrator 12 bonded to the piezoelectric element 11 is bent and oscillated. The piezoelectric element 11 bears against the moving body 13 at given timing. The moving body 13 to which a frictional force is applied is rotated in a desired direction.

The control in accordance with the present embodiment is next described by referring to FIG. 1.

First, the CPUs of the control circuit 31 and the comparator circuit 32 expand the control program and the comparison program onto the RAMs and execute these programs.

Information about the voltage of the power supply 21 detected by the voltage-detecting circuit 34 is produced as an analog signal to the signal processor circuit 33. The information about the voltage that is an analog signal is converted into a digital signal by the signal processor circuit 33 and sent to the comparator circuit 32.

If the information about the voltage sent to the comparator circuit 32 is compared with the voltage indicated by the set data 32a, then information about the comparison is created, based on the comparison, and sent to the control circuit 31. If the information about the voltage in this information about the comparison does not agree with the voltage indicated by the set data 32a, then the control circuit 31 creates information about control to adjust the voltage sent to the amplifier circuit 22. This information about the control is delivered to the voltage-adjusting circuit 21a.

The delivered information about the control modifies the resistance value of the voltage-adjusting circuit 21a, adjusts the voltage produced to the amplifier circuit 22, and supplies an optimum voltage to the amplifier circuit 22.

In the present embodiment described thus far, the voltage-detecting circuit 34 detects the voltage of the power supply 21. The comparator circuit 32 compares the voltage of the power supply with the voltage indicated by the set data 32a. If the voltage of the power supply is not coincident with the voltage indicated by the set data 32a, the control circuit 31 modifies the resistance value of the voltage-adjusting circuit 21a to supply an optimum voltage to the amplifier circuit 22. Therefore, if the voltage of the power supply 21 varies due to aging characteristics, the voltage supplied to the amplifier circuit 22 is optimized.

In a modification of the present embodiment, a rotation-detecting means 35 detects the rotational speed of the moving body 13 instead of detecting the voltage of the power supply 21 by the voltage-detecting circuit 34, thus controlling the rotational speed, as shown in FIG. 1.

An encoder consisting of a mark stuck on the moving body 13 is used as the rotation-detecting means 35, for example. The mark is detected whenever the moving body rotates. Information about the rotational speed is created, based on the detected rotational speed, and the information about the rotational speed is sent to the signal processor circuit 33.

The comparator circuit 32 compares the rotational speed indicated by the set data 32a with the information about the rotational speed, and creates information about the comparison.

The control circuit 31 creates information to adjust the voltage produced to the amplifier circuit 22, if the entered information about the rotational speed does not agree with the rotational speed indicated by the set data 32a, and sends the information to the voltage-adjusting circuit 21a.

The control in the present modified embodiment is next described by referring to FIG. 1.

In FIG. 1, the CPUs of the control circuit 31 and the comparator circuit 32 expand the control program and the comparison program onto their respective RAMs and execute these programs.

Information about the rotational speed of the moving body 13 detected by the rotational speed-detecting means 35 is sent as an analog signal to the signal processor circuit 33. The information about the rotational speed that is an analog signal is converted into a digital signal by the signal processor circuit 33 and sent to the comparator circuit 32.

The information about the rotational speed sent to the comparator circuit 32 is compared with the rotational speed indicated by the set data 32a. Information about the comparison is created and sent to the control circuit 31.

If the information about the rotational speed is not coincident with the set data 32a in this information about the comparison, the control circuit 31 creates information about control to adjust the voltage produced to the amplifier circuit 22. This information about the control is produced to the voltage-adjusting circuit 21a. The entered information about the control modifies the resistance value of the voltage-adjusting circuit 21a, adjusting the voltage produced to the amplifier circuit 22. The feedback control described thus far is repeated, thus controlling the rotational speed of the moving body 13 to the rotational speed indicated by the set data 32a.

As described thus far, in the present embodiment, the rotational speed of the moving body 13 is detected. The detected rotational speed is compared with the rotational speed indicated by the set data 32a. If the detected rotational speed is not coincident with the rotational speed indicated by the set data 32a, the resistance value of the voltage-adjusting circuit 21 is modified to bring the rotational speed of the moving body 13 into agreement with the rotational speed indicated by the set data 32a. This modifies the voltage produced to the amplifier circuit 22. In consequence, the moving body 13 is rotated at a desired rotational speed.

As another modification of the embodiment, a time-measuring circuit 36 measures time elapsing since start and the voltage-adjusting circuit 21a is controlled, as shown in FIG. 1, instead of detecting the voltage of the power supply 21 by the voltage-adjusting circuit 34.

The time-measuring circuit 35 measures the time elapsing since start, for example, creates information about the time, and sends the information about the time to the signal processor circuit 33.

The comparator circuit 32 compares the data about the time indicated by the set data 32a with the information about the time, creates information about the information, and sends the information to the control circuit 31. The data about the time means time elapsing from start to an instant when a steady state is reached.

The control circuit 31 creates information about control to adjust the voltage produced to the amplifier circuit 22 when the data about the time indicated by the set data 32a agrees with the information about the time in the information about the comparison. The information is sent to the voltage-adjusting circuit 21a.

The control in the present embodiment is next described by referring to FIG. 1.

The CPUs of the control circuit 31 and the comparator circuit 32 expand the control program and the comparison program onto their respective RAMs and execute these programs.

At start, the resistance of the voltage-adjusting circuit 21a is set to its optimum value. The ultrasonic motor is started. If the time-measuring means 36 begins to detect the elapsed time, the information about the detected time is sent as an analog signal to the signal processor circuit 33. The information about the time that is an analog signal is converted into a digital signal by the signal processor circuit 33 and sent to the comparator circuit 32.

If the information about the time entered into the comparator circuit 32 is compared with the data about the time indicated by the set data 32a, information about the comparison is created and sent to the control circuit 31. If the set time indicated by the set data 32*a* is coincident with the information about the time in this information about the comparison, the control circuit 31 creates information about control to adjust the voltage supplied to the amplifier circuit 22. The information about the control is produced to the voltage-adjusting circuit 21*a*. The produced voltage-adjusting circuit 21*a* modifies the resistance value of the voltage-adjusting circuit 21*a*, thus adjusting the voltage supplied to the amplifier circuit 22 to a voltage adapted to a steady state.

As described thus far, in the present embodiment, the voltage supplied to the amplifier circuit 22 is optimized during start and steady state. The ultrasonic motor is driven according to the load during start and steady state.

{Embodiment 2}

Figure 3:
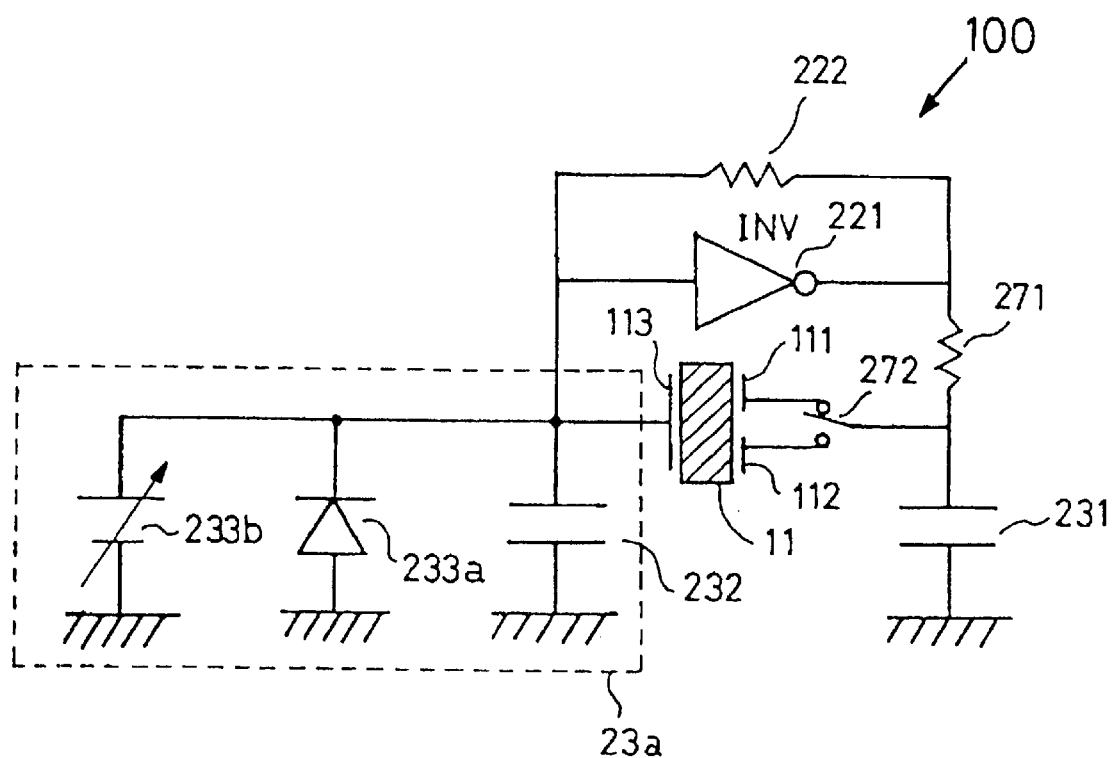
FIG. 3 is a diagram showing a circuit of Embodiment 2 of the present invention applied to an ultrasonic motor.

FIG. 3 is a diagram showing a circuit of Embodiment 2 of the present invention applied to an ultrasonic motor.

The present embodiment is similar in configuration with the ultrasonic motor body, the driver circuit, and the control portion of Embodiment 1 but characterized in that the phase-adjusting circuit 23*a* is added to the driver circuit 100. The same structures as those of Embodiment 1 will not be described below.

In FIG. 3, the phase-adjusting circuit 23*a* comprises a capacitor 232 shared with the phase-setting circuit 23, a variable-capacitance diode 233*a*, and a variable power supply 233*b*. One end of the diode 233*a* is connected with the capacitor 232, while the other end is grounded. One end of the power supply 233*b* is connected with the variable-capacitance diode 233*a*, the other end being grounded. The variable power supply 233*b*, receiving information about control from the control circuit 31, produces a given voltage to change the capacitance of the variable-capacitance diode 233*a*.

The phase-adjusting circuit 23 is not limited to the variable-capacitance diode 233*a*. A variable resistor or a variable inductance may also be used.

The control circuit 31 creates information about control to adjust the time constant of the phase-adjusting circuit if the detected voltage of the power supply is not coincident with the voltage indicated by the set data 32*a*.

The control in the present embodiment is next described.

The CPUs in the control circuit 31 and the comparator circuit 32 expand the control program and the comparison program onto RAMs and run these programs.

Information about the voltage of the power supply 21 detected by the voltage-detecting circuit 34 is produced as an analog signal to the signal processor circuit 33. The information about the voltage that is an analog signal is converted into a digital signal by the signal processor circuit 33 and produced to the comparator circuit 32. The produced information about the voltage is compared with the voltage indicated by the set data 32*a* by the comparator circuit 32, and information about the comparison is created. The information about the comparison is produced to the control circuit 31. If the information about the voltage in the information about the comparison applied to the control circuit 31 does not agree with the voltage indicated by the set data 32*a*, information about control for adjusting the time constant of the phase-adjusting circuit 23*a* is created. This information about the control is delivered to the phase-adjusting circuit 23*a*. The entered information about the control varies the capacitance of the variable-capacitance diode 233*a* of the phase-adjusting circuit,23*a*, adjusting the time constant.

As described far, in the present embodiment, the voltage of the power supply 21 is detected. The voltage of the power supply is compared with the voltage indicated by the set data 32*a*. If the voltage of the power supply is not coincident with the voltage indicated by the set data 32*a*, the capacitance of the variable-capacitance diode 233*a* of the phase-adjusting circuit 23*a* is varied. Therefore, the time constant of the phase-setting circuit 23 is optimized according to variations in the voltage of the power supply 21.

What is detected is the voltage of the power supply 21 detected by the voltage-detecting circuit 34. Besides, the rotation-detecting means 35 may detect the rotational speed of the moving body 13. In addition, the time-measuring circuit 36 may detect the time elapsing since start.

FIG. 4 shows a modification of Embodiment 2.

Figure 4A:
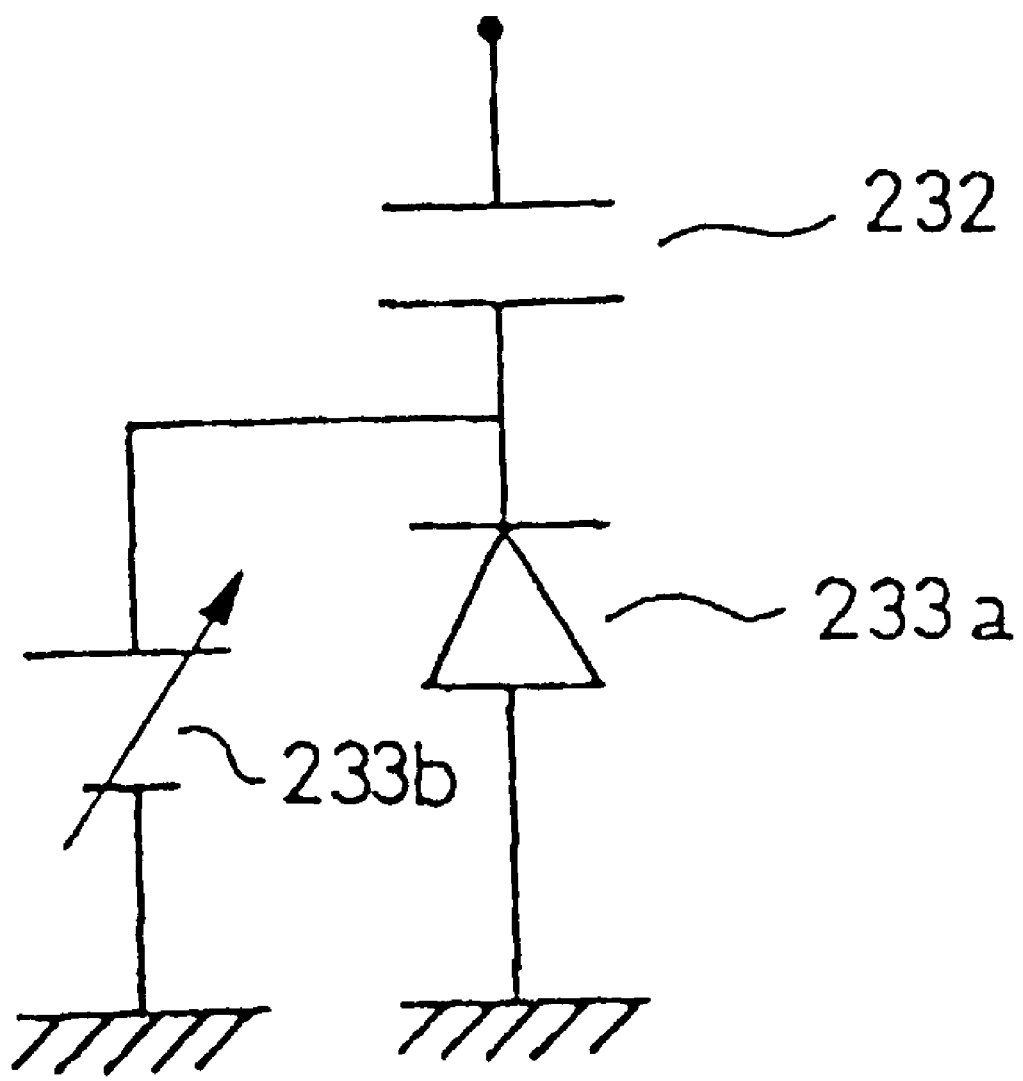
FIG. 4 is a diagram showing a circuit of a modified embodiment associated with FIG. 3.
Figure 4B:
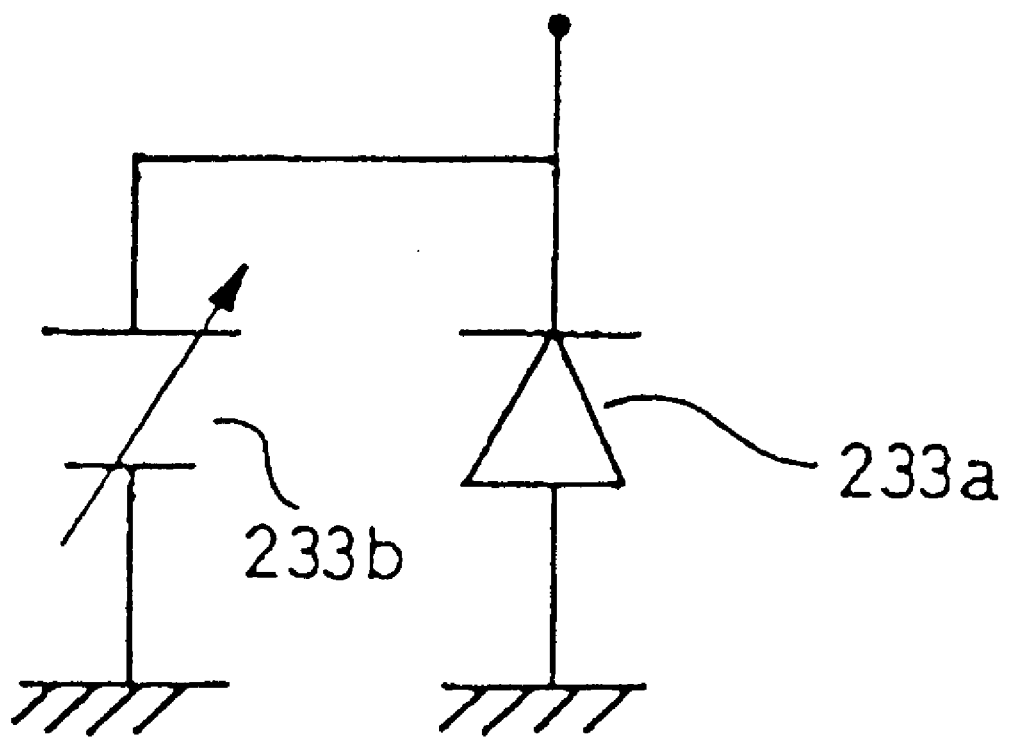

In FIG. 4A, a variable-capacitance diode 233*a* is connected in series with the capacitor 232. In FIG. 4B, the capacitor 232 is removed, and the variable-capacitance diode 233*a* is directly connected with the driver circuit 100. Even in these embodiments, the phase of the driver circuit 100 can be adjusted.

Figure 4C:
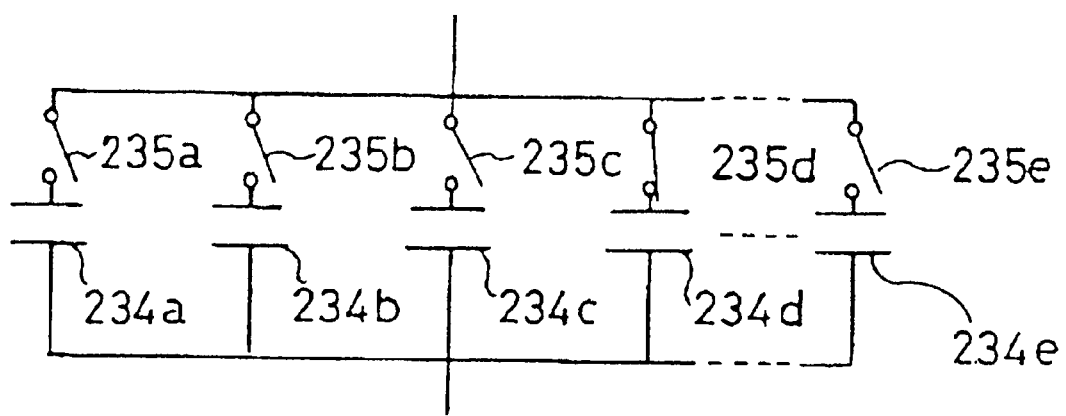

In FIG. 4C, capacitors 234*a*, 234*b*, 234*c*, 234*d*, and 234*e* are connected in parallel together with switches 235*a*, 235*b*, 235*c*, 235*d*, and 235*e*.

In this configuration, the switching devices 235*a* 235*e* are switched to select functioning ones out of the capacitors 234*a* . . . 234*e*. Thus, the phase of the driver circuit 100 can be adjusted.

{Embodiment 3}

Figure 5:
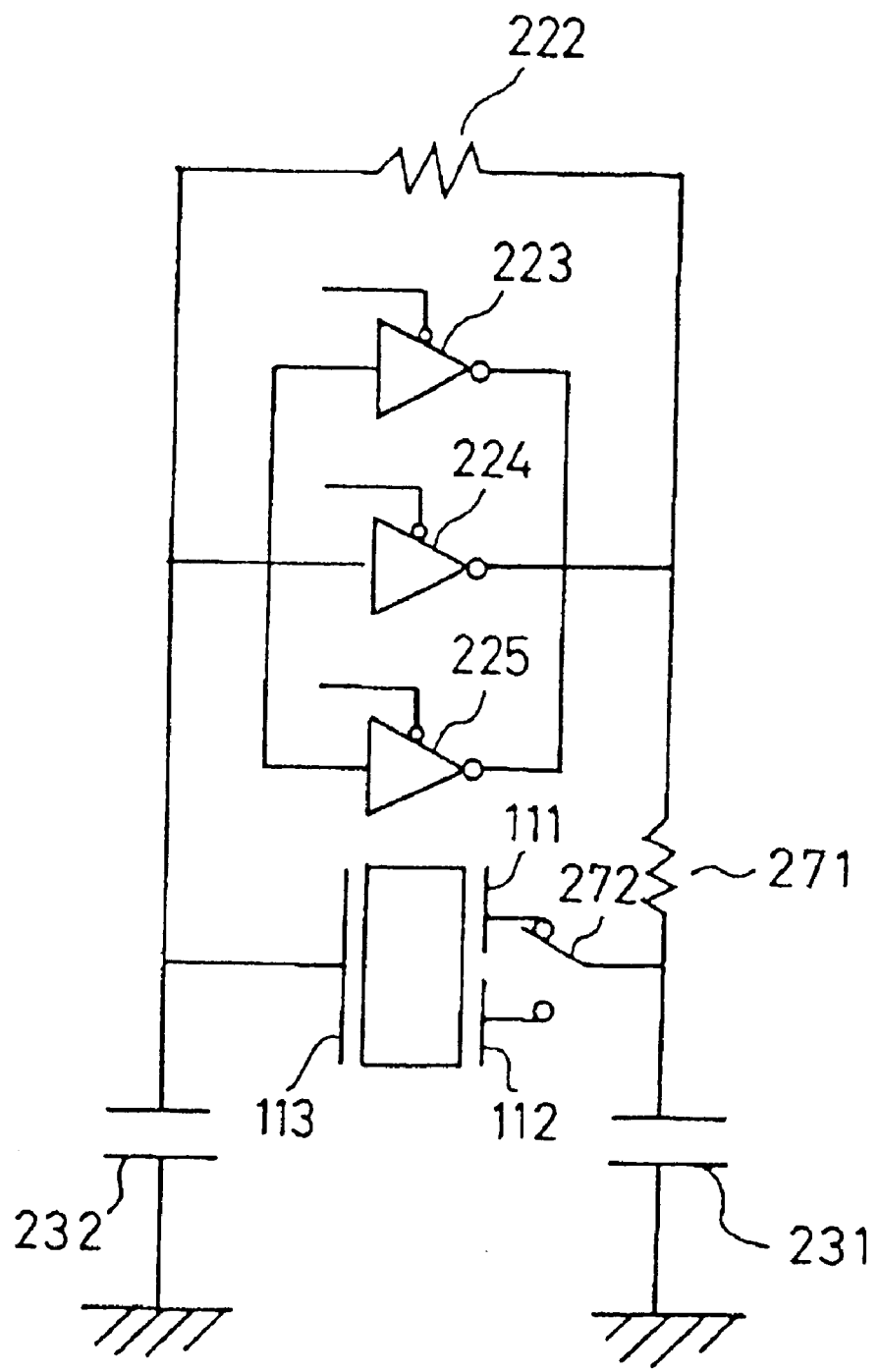
FIG. 5 is a block diagram showing Embodiment 3 of the present invention applied to an ultrasonic motor.

FIG. 5 is a diagram showing a circuit of Embodiment 3 of the present invention applied to an ultrasonic motor.

The present embodiment is similar to the configuration of Embodiment 1 except that tri-state buffers 223, 224, and 225 are connected in parallel as the amplifier circuit 22.

These tri-state buffers 223, 224, and 225 select functioning ones out of the buffers 223, 224, and 225 according to information about the control from the control circuit 31 acting as a selector circuit in accordance with the present invention. The output impedance varies according to the number of the selected buffers 223, 224, and 225, whereby the output current is adjusted.

Where the voltage of the power supply is different from the data of the set data 32*a*, the control circuit 31 creates information about control to select buffers, for adjusting the output impedance. The information about the control is sent to the amplifier circuit 22.

Control in the present embodiment is next described by referring to FIG. 1.

The CPUs of the control circuit 31 and the comparator circuit 32 expand the control program and the comparison program onto RAMs and execute these programs.

The voltage-detecting circuit 34 detects the voltage of the power supply 21 and delivers information about the detected voltage as an analog signal to the signal processor circuit 33. The information about the voltage that is an analog signal is converted into a digital signal by the signal processor circuit 33 and sent to the comparator circuit 32. The information about the voltage sent to the comparator circuit 32 is compared with the voltage indicated by the set data 32*a*. Information about the comparison is created and sent to the control circuit 31. If the information about the voltage in this information about the comparison does not agree with the voltage indicated by the set data 32*a*, then the control circuit 31 creates information about control to select those of the buffers 223, 224, and 225 that are made to function. This information about the control is sent to the amplifier circuit 22. The entered information about the control selects those of the buffers 223, 224, and 225 that are made to function. As a result, the output impedance is adjusted.

As described thus far, in the present embodiment, where the voltage of the power supply 21 is not coincident with the set data 23a, those of the buffers 223, 224, and 225 that are made to function are selected. Therefore, the output impedance of the amplifier circuit 22 is optimized according to variations in the voltage of the power supply 21.

What is detected is the voltage of the power supply 21 detected by the voltage-detecting circuit 34. Besides, the rotation-detecting means 35 may detect the rotational speed of the moving body 13. In addition, the time-measuring circuit 36 may detect the time elapsing since start.

{Embodiment 4}

Figure 6:
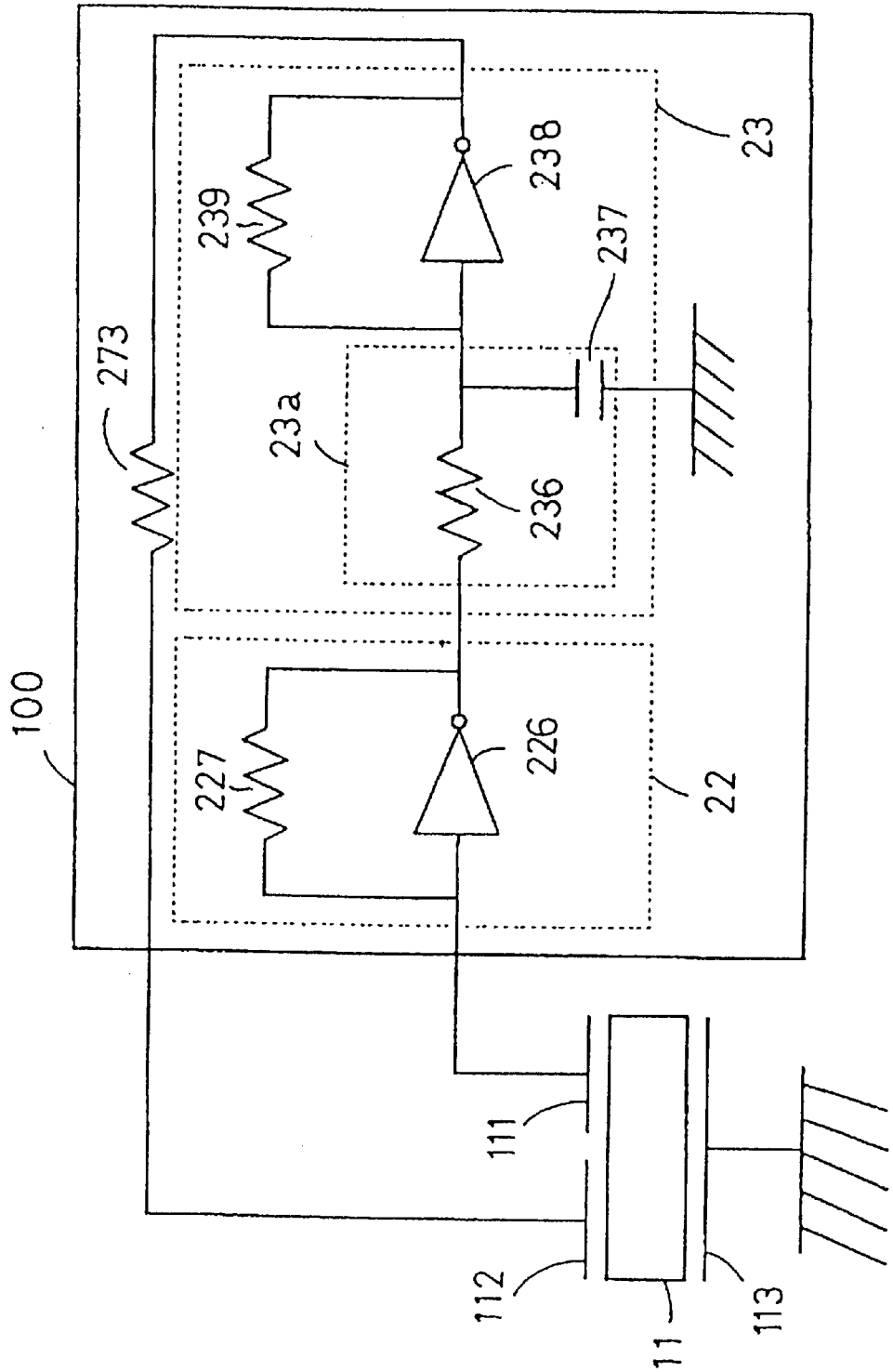
FIG. 6 is a block diagram showing Embodiment 4 of the present invention applied to an ultrasonic motor.

FIG. 6 is a diagram showing a circuit in accordance with Embodiment 4 of the invention applied to an ultrasonic motor.

The present embodiment is similar in configuration to Embodiment 1 but the structure of the driver circuit has different features. It is noted that the ultrasonic motor body is identical in configuration with that of Embodiment 1.

In FIG. 1, this driver circuit has the amplifier circuit 22 receiving the output voltage from the power supply 21 and a phase-adjusting circuit 23 for setting an excitation signal amplified by the amplifier circuit 22 to a desired phase.

As shown in FIG. 6, the amplifier circuit 22 comprises an inverter 226 and a resistor 227 connected in parallel with the inverter 226. The input end of the inverter 226 is connected with the first electrode pattern 111 on the piezoelectric element 11, the output end being connected with the phase-setting circuit 23. If the excitation signal detected with the first electrode pattern 111 on the piezoelectric element 11 is applied to the input end of the inverter 226, the entered excitation signal is inverted and amplified. The output end produces the excitation signal to the phase-setting circuit 23.

The phase-setting circuit 23 comprises a resistor 236 connected in series with the output end of the inverter 226, a capacitor 237 having one end connected with the other end of the resistor 236 and the other end grounded, an inverter 238 connected with the resistor 236 and with the other end of the capacitor 237, and a resistor 239 connected in parallel with the inverter 238. The resistor 236 and the capacitor 237 adjust the phase of the excitation signal. The inverter 238 inverts and amplifies the excitation signal whose phase has been adjusted. The resistor 273 is mounted to smooth the excitation signal.

In FIG. 1, the control portion comprises a control circuit 31, a comparator circuit 32, a signal processor circuit 33, a voltage-detecting circuit 34, and a voltage-adjusting circuit 21a.

The operation of the present embodiment is next described.

In FIG. 6, if a power supply 21 (not shown) is turned ON, producing an excitation signal, then the excitation signal applied to the inverter 226 is inverted, amplified, and produced as an output. The produced excitation signal is adjusted in phase by the resistor 236 and the capacitor 237 and applied to the inverter 238. The entered excitation signal is inverted and amplified by the inverter 238. The excitation signal inverted and amplified is smoothed by the resistor 272 and applied to the second electrode pattern 112. The applied excitation signal oscillates the piezoelectric element 11. Information about the oscillation of the piezoelectric element 11 is produced as an excitation signal from the first electrode pattern and applied again to the inverter 226.

The piezoelectric element 11 then vibrates at a given frequency. The vibrator 12 bonded to the piezoelectric element 11 is bent and vibrated and abuts against the moving body 13 at given timing. The moving body 13 to which a frictional force is applied is rotated in a given direction.

A control method similar to the method of Embodiment 1 is employed. What is detected is the voltage of the power supply 21. Moreover, the rotational speed of the moving body 13 may be detected by the rotation-detecting means 35. Furthermore, the time-measuring circuit 36 may measure the time elapsing since start. What is controlled is the voltage of the power supply adjusted by the voltage-adjusting circuit 21a. Alternatively, either the resistor 236 or the capacitor 237 of the phase-setting circuit 23 may be made variable and formed as the phase-adjusting circuit 23a. The time constant may be adjusted. Instead of the inverter 226, a plurality of tri-state buffers may be connected in parallel. Those of the buffers that are made to function are selected.

As described thus far, the present embodiment produces the same effects as Embodiment 1.

{Embodiment 5}

Figure 7:
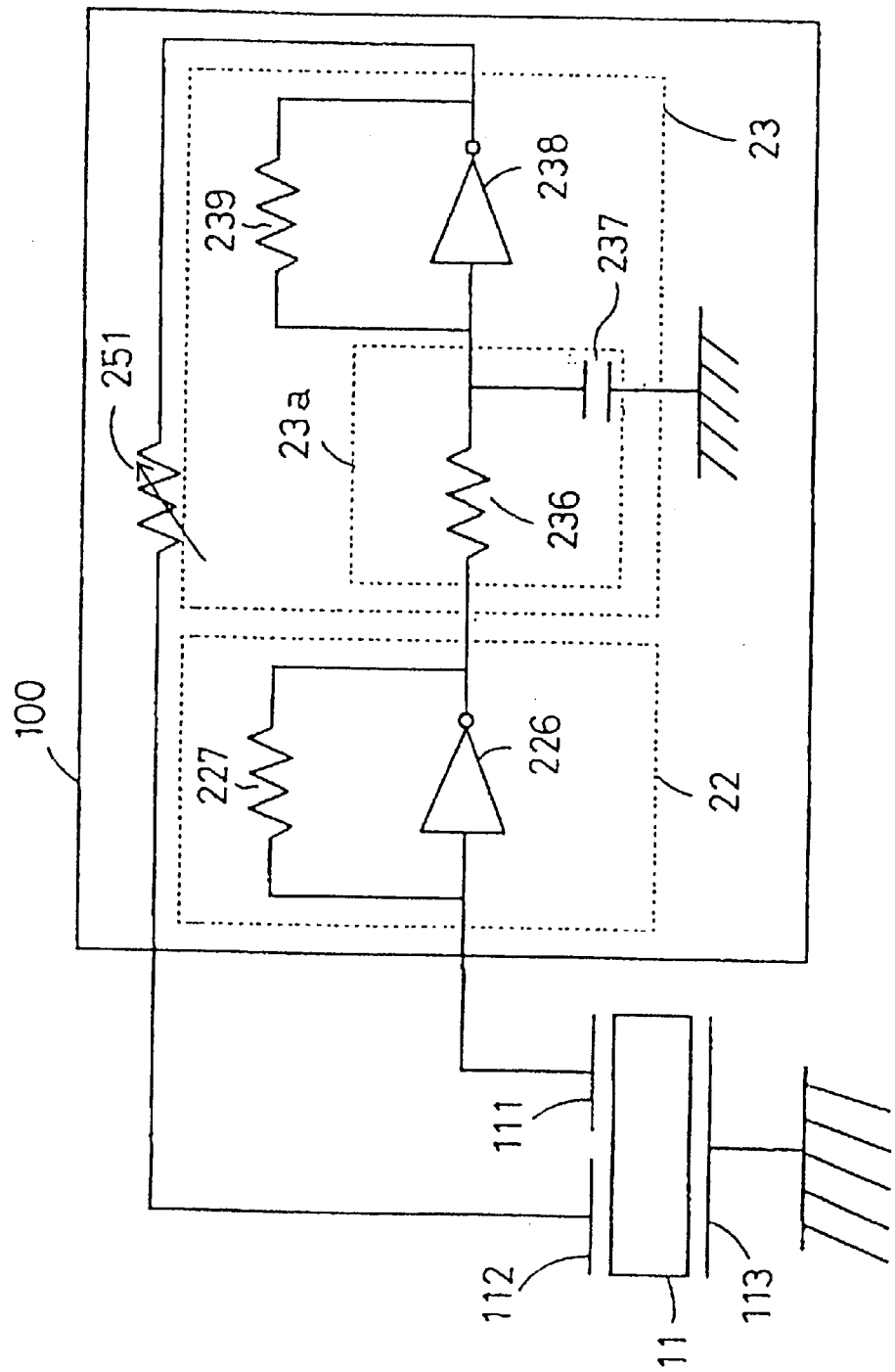
FIG. 7 is a block diagram showing Embodiment 5 of the present invention applied to an ultrasonic motor.

FIG. 7 is a diagram showing a circuit in accordance with Embodiment 5 of the invention applied to an ultrasonic motor.

The driver circuit of the present embodiment is similar to that of Embodiment 4. In FIG. 1, a current-adjusting circuit 25 is added, constituting a different feature.

As shown in FIG. 7, the current-adjusting circuit 25 consists of a variable resistor 251 that adjusts the current supplied into the driver circuit. The current-adjusting circuit 25 is not limited to the variable resistor 251. Moreover, a plurality of resistors may be connected in parallel, and they may be switched with a switch.

The control circuit 31 produces information about control to modify the resistance value of the variable resistor 251 if the information about the voltage detected by the voltage-detecting circuit 34 is not coincident with the set data 32a of the comparator circuit 32.

The control in accordance with the present embodiment is next described.

The CPUs of the control circuit 31 and the comparator circuit 32 expand the control program and the comparison program onto RAMs and execute these programs.

Information about the voltage of the power supply 21 detected by the voltage-detecting circuit 34 is produced as an analog signal to the signal processor circuit 33. The information about the voltage that is an analog signal is converted into a digital signal by the signal processor circuit 33 and sent to the comparator circuit 32.

The information about the voltage sent to the comparator circuit 32 is compared with preset voltage indicated by the set data 32a. Information about the comparison is created and sent to the control circuit 31.

If the information about the voltage sent to the control circuit 31 in the information about the comparison is not coincident with the set data 32a, the control circuit 31 creates information about control to modify the resistance value of the variable resistor 251. This information about the control is produced to the voltage-adjusting circuit 25. The information about the control sent to the voltage-adjusting circuit 25 modifies the resistance value of the variable resistor 251, adjusting the current supplied into the driver circuit.

As described thus far, in the present embodiment, if the voltage of the power supply 21 is not coincident with the voltage indicated by the set data 23a, the resistance value of the variable resistor 251 is changed. This optimizes the current supplied into the driver circuit.

In the present embodiment, the voltage of the power supply 21 is detected by the voltage-detecting circuit 34. In addition, the rotational speed of the moving body 13 may be detected by the rotation-detecting means 35. Furthermore, the time elapsing since start may be detected by the time-measuring circuit 36.

{Embodiment 6}

Figure 8:
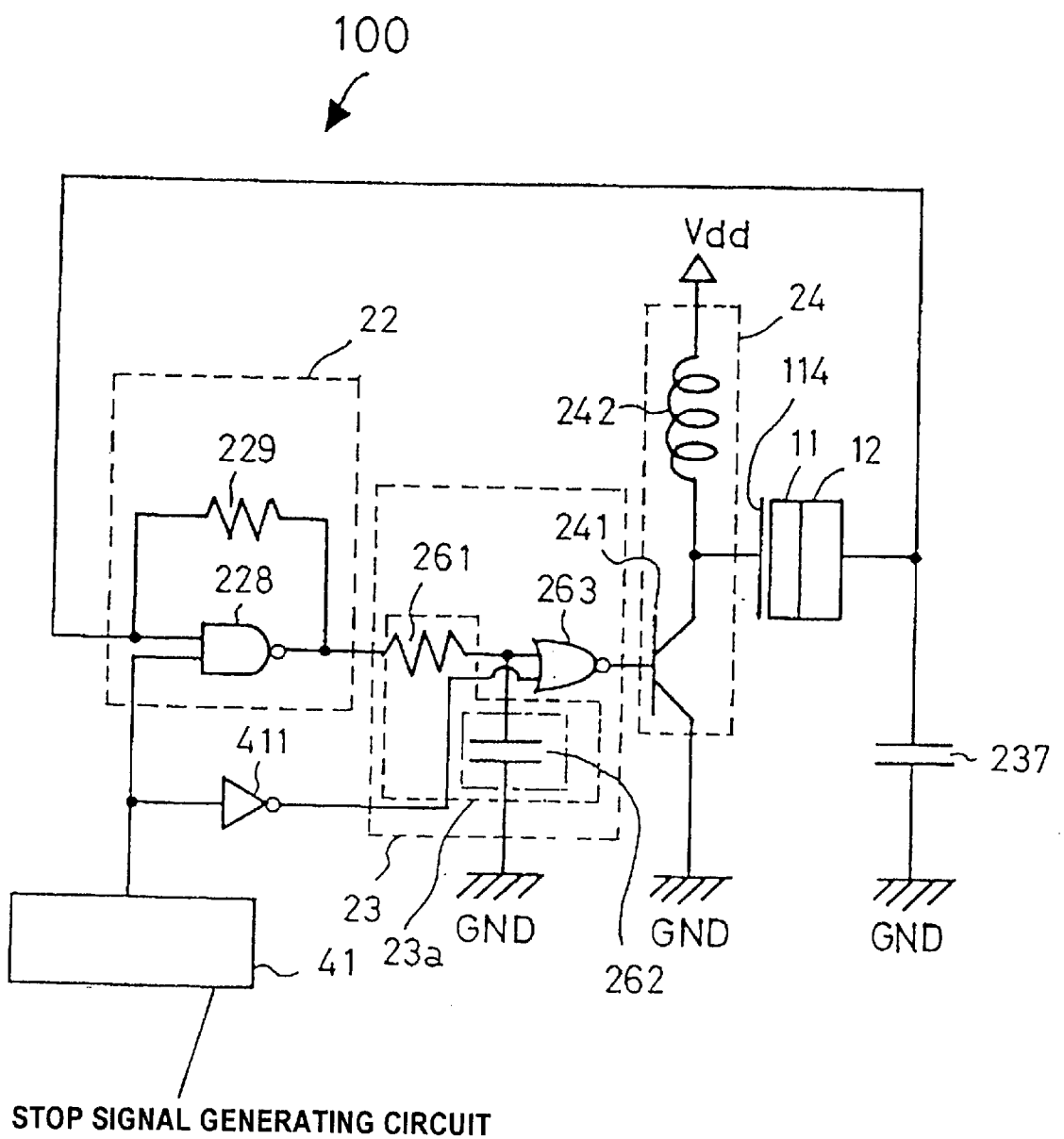
FIG. 8 is a block diagram showing Embodiment 6 of the present invention applied to an ultrasonic motor.

FIG. 8 is a diagram showing a circuit of Embodiment 6 of the invention applied to an ultrasonic motor.

A set of electrode pattern 114 consisting of plural electrodes is formed on one face of the piezoelectric element 11 of the body of the ultrasonic motor. A vibrator 12 is bonded to the other face. This vibrator 12 acts also as an electrode. The piezoelectric element 11 is self-excited by an excitation signal consisting mainly of the natural frequency produced in the driver circuit 100. Vibrations due to the self-oscillation are transmitted to the vibrator 12. The vibrator 12 detects information about the vibrations of the piezoelectric element 11 and produces an output signal to the driver circuit 100.

In FIG. 1, the driver circuit 100 is characterized in that it comprises the amplifier 22 for amplifying an excitation signal, a phase-setting circuit 23 for setting the phase of the excitation signal inverted and amplified by the amplifier circuit 22, a step-up circuit 24 for stepping up the excitation signal, and a stop signal-generating circuit 41 for determining stop of the driver circuit.

The amplifier circuit 22 comprises a NAND gate 228 and a resistor 229 connected in parallel with the NAND gate 228. One of two input ends of the NAND gate 228 is connected with the vibrator 12, while the other end is connected with the stop signal-generating circuit 41. An excitation signal detected by the vibrator 12 is inverted, amplified, and produced to the phase-setting circuit 23.

The phase-setting circuit 23 is connected with a resistor 261 whose one end is connected with the output end of the NAND gate 228. The other end of the resistor 261 is connected with a capacitor 262 whose one end is grounded and with one input end of a NOR gate 263. The other input end of the NOR gate 263 is connected with the stop signal-generating circuit 41 via an inverter 411. The output end of the NOR gate 263 is connected with the base of an NPN transistor 241 of the step-up circuit 24.

The stop signal-generating circuit 41 produces an enabling signal (HIGH signal) during normal operation of the driver circuit. The circuit 41 produces a stop signal (LOW signal) to the NAND gate 228 and NOR gate 263, thus stopping the excitation signal produced in the driver circuit 100.

The step-up circuit 24 comprises the NPN transistor 241 and a step-up coil 242 connected with the collector electrode of the NPN transistor 241. This transistor 241 has a NOR gate 263 connected with the base electrode of the transistor 241, the emitter electrode being grounded. The NPN transistor 241 performs switching action. The step-up coil 242 steps up the excitation signal and sends it to the electrode pattern 114.

In FIG. 1, the control portion comprises a control circuit 31, a comparator circuit 32, a signal processor circuit 33, a voltage-detecting circuit 34, and a voltage-adjusting circuit 21b. The voltage-detecting circuit 34 detects the voltage of the power supply 21 and adjusts the voltage produced to the step-up circuit 24.

The operation of the present embodiment is next described by referring to FIG. 8.

The power supply 21 (not shown) is turned ON. The enabling signal (HIGH signal) produced from the stop signal-generating circuit 41 is divided into two parts flowing in different directions. One enabling signal is applied to one input terminal of the NAND gate 228. If LOW signal, for example, is applied to the other input end of the NAND gate 228, it produces HIGH signal.

The phase of the produced HIGH signal is adjusted by the resistor 261 and the capacitor 262 and applied to one input end of the NOR gate 263. Applied to the other input end of the NOR gate 263 is the phase-set HIGH signal that is produced by the stop signal-generating circuit 41 and inverted and amplified by the inverter 411. Therefore, the NOR gate 263 produces LOW signal, which is applied to the base electrode of the NPN transistor 241, turning it off.

When HIGH signal is applied to the other input end of the NAND gate 228, the NOR gate 263 produces HIGH signal, thus turning on the NPN transistor 241.

When the NPN transistor 241 is switched from ON state to OFF state or from OFF state to ON state, the excitation signal is stepped up by the step-up coil 242, smoothed, and applied to the electrode pattern 114.

The excitation signal applied to the electrode pattern 114 vibrates the piezoelectric element 11. Information about the vibrations of the piezoelectric element 11 is detected by the vibrator 12 and applied to the amplifier circuit 22.

When the enabling signal (HIGH signal) is being produced from the stop signal-generating circuit 41, the NAND gate 228 acts as an inverter for inverting and amplifying the signal from the vibrator 12. Therefore, the input signal from the vibrator 12 is inverted and amplified by the NAND gate 228 and produced to the phase-setting circuit 23. In this way, the excitation signal is fed back. Consequently, the excitation signal consisting principally of the natural frequency is produced perpetually.

When the stop signal-generating circuit 41 is producing the stop signal (LOW signal), the NAND gate 228 keeps producing HIGH signal. This HIGH signal is applied to one input end of the NOR gate 263. The HIGH signal that is inverted and amplified by the inverter 411 is applied from the other input end of the NOR gate 263 and so LOW signal is kept produced to the NPN transistor 241. This turns off the NPN transistor 241, stopping the excitation signal from the driver circuit.

Control in the present embodiment is next described by referring to FIG. 1.

In FIG. 1, the CPUs of the control circuit 31 and the comparator circuit 32 expand the control program and the comparison program onto their respective RAMs and execute these programs.

Information about the voltage of the power supply 21 detected by the voltage detection circuit 34 is sent as an analog signal to the signal processor circuit 33. The information about the voltage that is an analog signal is converted into a digital signal by the signal processor circuit 33 and sent to the comparator circuit 32.

The information about the voltage sent to the comparator circuit 32 is compared with the voltage value indicated by the set data 32a, and information about the comparison is created. The information about the comparison is sent to the control circuit 31. If the information about the voltage in this information about the comparison does not agree with the set data 32a, the control circuit 31 creates information about control to adjust the voltage produced to the step-up circuit 24. This information about the control is sent to the voltage-adjusting circuit 21b.

The produced information about the control modifies the resistance value of the voltage-adjusting circuit 21b, adjusting the voltage produced to the step-up circuit 24. As a result, an optimum voltage is supplied to the step-up circuit 24.

In this control method, what is detected may be the rotational speed of the moving body 13. Alternatively, the time-measuring circuit 36 may measure the time elapsing since start.

What is controlled may be the voltage-adjusting circuit 21a for adjusting the voltage produced to the amplifier circuit 22. Either the resistance 261 or the capacitor 262 of the setting circuit 23 may be made variable, and the phase-adjusting circuit 23a may be controlled.

As described thus far, in the present embodiment, if the voltage indicated by the set data 23a is not coincident with the voltage of the power supply 21, the voltage supplied to the step-up circuit 24 is modified. Therefore, if the voltage of the power supply 21 varies due to aging characteristics, the voltage supplied to the step-up circuit 22 is optimized.

{Embodiment 7}

Figure 9:
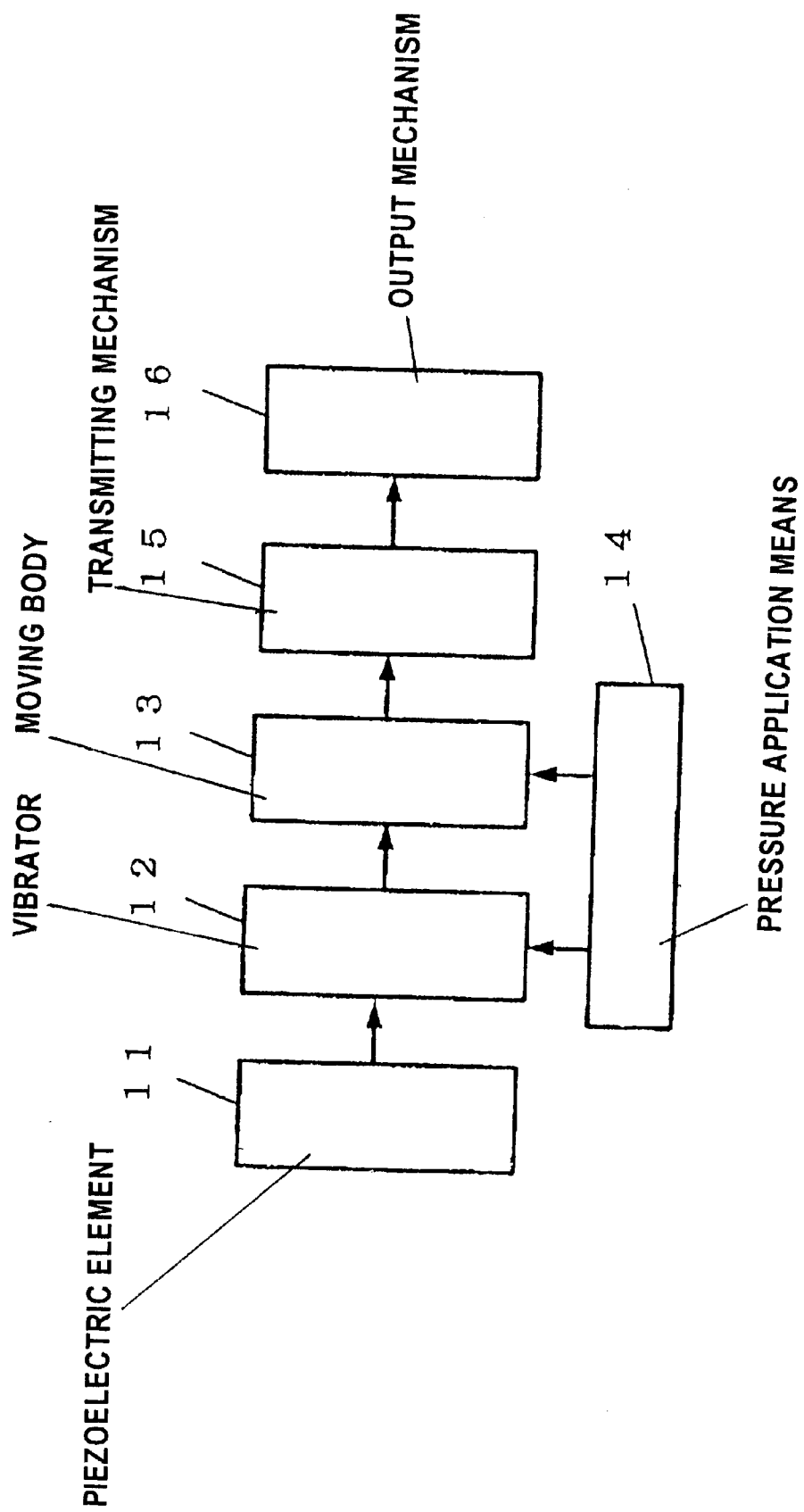
FIG. 9 is a block diagram showing Embodiment 7 of the present invention applied to an ultrasonic motor.

FIG. 9 shows a block diagram of Embodiment 7 of the present invention in which an ultrasonic motor is applied to an electronic device or appliance.

The present electronic device is realized by comprising the aforementioned vibrator 11, the moving body 13 moved by the vibrator 11, the pressure application means 14 for applying a pushing force to the moving body 13 and to the vibrator 11, a transmitting mechanism 15 interlocking with the moving body 13, and an output mechanism 16 moving based on the operation of the transmitting mechanism 15.

In this embodiment, a transfer wheel such as a toothed wheel or friction wheel is used as the transmitting mechanism 15. In a camera, a shutter drive mechanism or a lens drive mechanism is used as the output mechanism 16. In an electronic timepiece, a hand drive mechanism or a calendar drive mechanism is used as the output mechanism. In a machine tool, a cutting tool feed mechanism, a workpiece feed mechanism, or the like is used as the output mechanism.

The electronic device equipped with an ultrasonic motor in accordance with the present embodiment includes electronic timepieces, measuring instruments, cameras, printers, printing machines, machine tools, robots, and transport machines.

Where an output shaft is mounted to the moving body 13 and a power transfer mechanism for transmitting torque from the output shaft is provided, the ultrasonic motor itself realizes a drive mechanism.

As described thus far, in the present invention, the rotational speed of the moving body can be modified. Where the load varies, or the voltage of the power supply changes due to aging characteristics, the voltage supplied to the driver circuit is optimized.

According to an aspect of the invention, the selector circuit selects those of the plural amplifier circuits which are made to function, thus adjusting the output impedance of the amplifier circuits. Therefore, if the load varies, the output impedance of the amplifier circuits is optimized.

According to another aspect of the invention, and 7, the phase of the excitation signal for setting the phase-adjusting signal is adjusted. Therefore, the rotational speed of the moving body can be modified. Where the load varies or in other similar situation, the time constant of the phase-setting circuit is optimized.

According to another aspect of the invention, the current supplied into the driver circuit is adjusted and so the rotational speed of the moving body can be altered. Where a variation of the load or other similar situation takes place, the current supplied into the driver circuit is optimized.

According to still another aspect of the invention, the moving body of the ultrasonic motor is rotated at a desired rotational speed.

According to yet another aspect of the invention, the ultrasonic motor is optimally driven according to variations in the load between start and steady state.

According to the invention set forth in claim 11, the ultrasonic motor is optimally driven according to variations in the voltage of the power supply.

According to still yet another aspect of the invention, an electronic device or appliance driven by an ultrasonic motor to which the present invention is applied is realized.

What is claimed is:

1. An ultrasonic motor comprising:
   a piezoelectric element;
   a driver circuit for creating an excitation signal in accordance with excitation of the piezoelectric element;
   a power supply for supplying a voltage to the driver circuit, the piezoelectric element and the driver circuit cooperating to form a self-excited oscillator circuit; and
   adjusting means for adjusting the voltage supplied by the power supply to the driver circuit in accordance with a variation in a desired characteristic of the excitation of the piezoelectric element.

2. An ultrasonic motor as claimed in claim 1; wherein the adjusting means adjusts the voltage applied to an amplifier circuit for amplifying the excitation signal, the amplifier circuit being contained in the driver circuit.

3. An ultrasonic motor as claimed in claim 1; wherein the adjusting means adjusts the voltage applied to a step-up circuit for stepping up the excitation signal, the step-up circuit being contained in the driver circuit.

4. An ultrasonic motor as claimed in claim 1; further comprising
   rotational speed-detecting means for detecting a rotational speed of a moving body that is rotated based on excitation of the piezoelectric element;
   rotational speed-comparing means for comparing the rotational speed detected by the rotational speed-detecting means with a preset rotational speed; and
   rotational speed control means for controlling the adjusting means to bring the rotational speed of the moving body into agreement with the preset rotational speed if a result of the comparison made by the rotational speed-comparing means indicates that the detected rotational speed is not coincident with the preset rotational speed.

5. An ultrasonic motor as claimed in claim 1; further comprising:
   time-measuring means for measuring time elapsing from a start time;
   time-comparing means for comparing an elapsed time measured by the time-measuring means with preset data indicating a time between a start time and a time when a steady state is reached; and
   a circuit constant control means for controlling the adjusting means to adjust a ciruit constant of the ultrasonic motor so that the result of a comparison made by the time-comparing means indicates that the measured time is coincident with the preset data.

6. An ultrasonic motor as claimed in claim 1; further comprising:
   voltage-detecting means for detecting a voltage of the power supply;
   voltage-comparing means for comparing the voltage detected by the voltage-comparing means with a preset voltage value; and
   circuit constant control means for controlling the adjusting means to adjust a circuit constant of the ultrasonic motor if the result of a comparison made by the voltage comparison means indicates that the detected voltage of the power supply is not coincident with the preset voltage value.

7. In an electronic apparatus having an output mechanism for producing an output motion, an ultrasonic motor as claimed in claim 1 for driving the output mechanism to produce the output motion.

8. An ultrasonic motor according to claim 1; further comprising a vibrator bonded to the piezoelectric element, a moving body caused to abut against the vibrator, and pressure application means for urging the moving body against the vibrator so that the oscillation of the piezoelectric element causes vibration of the vibrator and the moving body is frictionally driven by the vibrator to undergo movement with respect to thereto.

9. An ultrasonic motor according to claim 8; wherein the piezoelectric element has a disk shape piezoelectric material element having a first face and a second face opposite the first face, first and second electrode patterns formed in alternate sectors of the first face, and a counter electrode formed on the second face.

10. An ultrasonic motor according to claim 9; wherein the power supply supplies a voltage to the first electrode pattern and the second electrode pattern in an alternate manner and the driver circuit amplifies, inverts and feeds back voltages output by the piezoelectric element to the self-excited oscillation.

11. An ultrasonic motor according to claim 10; wherein the amplifier comprises an inverter and a resistor connected in parallel with the piezoelectric element such that an output end of the inverter and one end of the resistor are connected with the first electrode pattern.

12. An ultrasonic motor according to claim 11; wherein the resistor is a variable resistor and comprises the adjusting means.

13. An ultrasonic motor according to claim 1; wherein the driving circuit comprises a phase setting circuit and an amplifier.

14. An ultrasonic motor according to claim 1; wherein the adjusting means comprises a variable resistor contained in the driving circuit for varying a current supplied to the piezoelectric element.

15. An ultrasonic motor comprising:

a piezoelectric element;

a driver circuit having plural amplifier circuits connected in parallel for amplifying an excitation signal in accordance with excitation of the piezoelectric element; and selecting means for selecting an amplifier circuit, wherein those of said plural amplifier circuits which are made to function are selected.

16. An ultrasonic motor comprising:

a piezoelectric element;

a driver circuit having a phase-setting circuit for setting a phase of an excitation signal in accordance with excitation of the piezoelectric element; and adjusting means for adjusting the phase of the excitation signal set by the phase-setting circuit.

17. An ultrasonic motor as claimed in claim 16; wherein the phase adjusting circuit comprises a variable-capacitance element varied by an externally applied voltage.

18. An ultrasonic motor as claimed in claim 16; wherein the phase adjusting circuit has a plurality of circuit elements connected in parallel and a selector element for selecting one or more of the circuit elements to function.

19. An ultrasonic motor comprising:

a piezoelectric element;

a driver circuit for generating an excitation signal in accordance with excitation of the piezoelectric element, and having a booster circuit; and adjusting means for adjusting a current supplied to the booster circuit or a current supplied to the piezoelectric element.

20. An ultrasonic motor comprising:

a piezoelectric element;

a driver circuit for generating an excitation signal for driving the piezoelectric element, the piezoelectric element and the driver circuit cooperating to form a self-excited oscillator;

a power supply for supplying a voltage to the driver circuit;

adjusting means for adjusting the voltage supplied to the driver circuit;

rotational speed-detecting means for detecting a rotational speed of a moving body that is rotated based on excitation of the piezoelectric element;

rotational speed-comparing means for comparing the rotational speed detected by the rotational speed-detecting means with a preset rotational speed; and rotational speed control means for controlling the adjusting means to bring the rotational speed of the moving body into agreement with the preset rotational speed if a result of the comparison made by the rotational speed-comparing means indicates that the detected rotational speed is not coincident with the preset rotational speed.

21. An ultrasonic motor according to claim 20; further comprising a vibrator bonded to the piezoelectric element, a moving body caused to abut against the vibrator, and the pressure application means for urging the moving body against the vibrator.

22. An ultrasonic motor according to claim 20; wherein the driver circuit comprises an amplifier circuit, and the adjusting means adjusts the voltage applied to the amplifier circuit.

23. An ultrasonic motor according to claim 20; wherein the driver circuit comprises a step-up circuit, and the adjusting means adjusts the voltage applied to the step-up circuit.

24. An ultrasonic motor according to claim 20; wherein the driver circuit has plural amplifier circuits connected in parallel for amplifying the excitation signal, and selecting means for selecting one or more of the amplifier circuits to function.

25. An ultrasonic motor according to claim 20; wherein the driver circuit has a phase-setting circuit for setting a phase of the excitation signal, and the adjusting means adjust the phase of the excitation signal set by the phase-setting circuit.

26. An ultrasonic motor according to claim 25; wherein the adjusting means comprises a variable-capacitance element having a capacitance value varied in response to an externally applied voltage.

27. An ultrasonic motor according to claim 25; wherein the adjusting means has a plurality of circuit elements connected in parallel and a selector element for selecting one or more of the circuit elements to function.

28. An ultrasonic motor according to claim 20; wherein the driver circuit comprises a booster circuit, and the adjusting means adjusts one of a current supplied to the booster circuit and a current supplied to the piezoelectric element.

29. An ultrasonic motor according to claim 20; further comprising time-measuring means for measuring time elapsing from a start time; time-comparing means for comparing an elapsing time measured by the time-measuring means with a preset time indicating a time between the start time and the time when a steady state should be reached; and circuit constant control means for controlling the adjusting means to adjust a circuit constant of the ultrasonic motor so that the measured time is coincident with the preset time.

30. An ultrasonic motor according to claim 20; further comprising voltage-detecting means for detecting a comparing of a power supply; voltage-comparing means for comparing the voltage detected by the voltage-comparing means with a preset voltage value; and circuit constant control means for controlling the adjusting means to adjust a circuit constant of the ultrasonic motor so that the detected voltage is coincident with the preset voltage value.

31. In an electronic apparatus having an output mechanism for producing an output motion, an ultrasonic motor as claimed in claim 20 for driving the output mechanism to produce the output motion.

* * * * *